United States Patent
Johansson et al.

(10) Patent No.: US 9,549,534 B2
(45) Date of Patent: Jan. 24, 2017

(54) METHOD FOR MILKING, COMPUTER PROGRAM PRODUCT, AND MILKING SYSTEM

(75) Inventors: Bjorn Johansson, Sodertalje (SE); Ola Markusson, Huddinge (SE)

(73) Assignee: DELAVAL HOLDING AB, Tumba (SE)

( * ) Notice: Subject to any disclaimer, the term of this patent is extended or adjusted under 35 U.S.C. 154(b) by 1563 days.

(21) Appl. No.: 13/060,698

(22) PCT Filed: Aug. 13, 2009

(86) PCT No.: PCT/EP2009/060525
§ 371 (c)(1),
(2), (4) Date: Feb. 25, 2011

(87) PCT Pub. No.: WO2010/023112
PCT Pub. Date: Mar. 4, 2010

(65) Prior Publication Data
US 2011/0155065 A1    Jun. 30, 2011

(30) Foreign Application Priority Data
Aug. 29, 2008    (SE) ...................................... 0801862

(51) Int. Cl.
*A01J 5/00* (2006.01)
*A01K 1/12* (2006.01)
(Continued)

(52) U.S. Cl.
CPC .................. *A01K 1/12* (2013.01); *A01J 5/007* (2013.01); *A01J 5/0175* (2013.01)

(58) Field of Classification Search
CPC ............... A01K 1/12; A01J 5/007; A01J 5/01; A01J 5/017; A01J 5/0175
(Continued)

(56) References Cited

U.S. PATENT DOCUMENTS

| 5,645,012 A | 7/1997 | Hoefelmayr |
| 5,743,209 A | 4/1998 | Bazin et al. |

(Continued)

FOREIGN PATENT DOCUMENTS

| EP | 1 163 841 A2 | 12/2001 |
| EP | 1 709 867 A1 | 10/2006 |

(Continued)

OTHER PUBLICATIONS

International-Type Search Report, dated Feb. 11, 2009, from corresponding PCT application.
(Continued)

*Primary Examiner* — Trinh Nguyen
(74) *Attorney, Agent, or Firm* — Young & Thompson

(57) ABSTRACT

A method for milking is provided in a milking system which includes a milking machine having a plurality of teat cups, which teat cups are attached to, and detached from, teats of animals as part of the milkings of the animals. The method determines whether an animal, which presents itself at the milking system, has a regular milking permission and when the animal has a regular milking permission the animal is milked in a regular milking procedure. When the animal does not have a regular milking permission, the method determine whether the animal has at least one udder compartment that was incompletely milked last time the animal was milked, and provided that the animal has at least one udder compartment that was incompletely milked last time the animal was milked, the animal is given a partial milking permission and the animal is milked in a partial milking procedure, wherein the regular and partial milking procedures differ from one another with respect to the procedure for the attachment of the teat cups to, and/or detachment of the teat cups from, the teats of the animal.

25 Claims, 1 Drawing Sheet

(51) Int. Cl.
*A01J 5/007* (2006.01)
*A01J 5/017* (2006.01)

(58) Field of Classification Search
USPC ............. 119/14.5, 14.02, 14.08, 14.14, 14.15,119/14.17, 14.03, 14.18
See application file for complete search history.

(56) References Cited

U.S. PATENT DOCUMENTS

| | | |
|---|---|---|
| 5,931,115 A | 8/1999 | Lind et al. |
| 2003/0065480 A1 | 4/2003 | Vijverberg et al. |
| 2004/0025792 A1 | 2/2004 | Sjolund et al. |
| 2004/0244699 A1 | 12/2004 | Schwering et al. |

FOREIGN PATENT DOCUMENTS

| | | |
|---|---|---|
| RU | 2 112 364 C1 | 6/1998 |
| RU | 2 210 886 C2 | 8/2003 |
| WO | 97/13403 A1 | 4/1997 |
| WO | 01/93667 A1 | 12/2001 |
| WO | 02/07505 A1 | 1/2002 |
| WO | 02/054857 A1 | 7/2002 |
| WO | 03/000042 A1 | 1/2003 |
| WO | 2004/100650 A1 | 11/2004 |
| WO | 2006/098678 A1 | 9/2006 |
| WO | 2008/028488 A2 | 3/2008 |

OTHER PUBLICATIONS

International Search Report, dated Nov. 15, 2010, from corresponding PCT application.
Supplementary International Search Report, dated Dec. 9, 2010, from corresponding PCT application.

METHOD FOR MILKING, COMPUTER PROGRAM PRODUCT, AND MILKING SYSTEM

TECHNICAL FIELD OF THE INVENTION

The present invention relates generally to dairy farming and to milking of dairy animals therein. Particularly, the invention relates to a method for milking, a computer program product for controlling the method, and a milking system.

DESCRIPTION OF RELATED ART AND BACKGROUND OF THE INVENTION

In modern dairy farm industry there are continuous research and development activities in order to improve the efficiency of various activities such as machine milking, which, inter alia, involves increased milk yield and reduced milking time, while, naturally, ethical aspects as well as animal care are considered.

Voluntary milking systems, which cows visit on a voluntary basis, have become increasingly common during the last years. In such systems cows are monitored and are given milking permission on an individual basis. Sometimes the milking performed by such a milking system is not complete, that is, it may happen that a cow that has been milked has an udder compartment that was incompletely milked. The incomplete milking may have been caused by a teat cup kick or fall off during milking. Incomplete milking may also be caused by a failed teat cup attachment, e.g. caused by a dirty camera lens, an unfavorable teat position, or interfering hairs. Incomplete milking may as well depend on a damaged or infected teat.

Typically, such cow may obtain a new milking permission directly or soon after the incomplete milking, and in connection with such subsequent milking, teat cups are again attached to the teats of the cow.

Such subsequent milking, wherein teat cups are attached to all teats of the cow and milking of all teats is performed, is time consuming and the teats get unnecessarily worn or rubbed.

SUMMARY OF THE INVENTION

It is an object of the present invention to provide a method for milking and a milking system, by which the above drawbacks are eliminated.

It is a further object of the invention to provide such method and milking system, which are accurate, efficient, reliable, of low cost, and easy to install.

These objects, among others, are attained by methods and systems as defined in the appended patent claims.

According to a first aspect of the invention a method for milking is provided in a milking system comprising a milking machine with a plurality of teat cups, which are attached to, and detached from, teats of animals as part of the milkings of the animals. According to the method it is determined whether an animal, which presents itself at the milking system, has a regular milking permission and if the animal has a regular milking permission the animal is milked in a regular milking procedure. If the animal does not have a regular milking permission, it is determined whether the animal has at least one udder compartment that was incompletely milked from the last time the animal was milked, and provided that the animal has at least one udder compartment that was incompletely milked from the last time the animal was milked, the animal is given a partial milking permission and the animal is milked in a partial milking procedure, wherein the regular and partial milking procedures differ from one another with respect to the procedure for the attachment of the teat cups to, and/or detachment of the teat cups from, the teats of the animal.

The determination as to whether an animal that presents itself at the milking system has an udder compartment that was incompletely milked from the last time the animal was milked can be made based on milk yields and/or milking times measured during the last milking.

In one embodiment, if the animal is given the partial milking permission, a teat cup is attached to, and milking is started of, only the teat or teats of the udder compartment or compartments that was/were determined to be incompletely milked from the last time the animal was milked. Finally, when the milking of the udder compartment or compartments that was/were determined to be incompletely milked from the last time the animal was milked is completed, the teat cups are detached from the teats of the udder compartment or compartments that was/were determined to be incompletely milked from the last time the animal was milked, and the animal is allowed to leave the milking system without teat cups being attached to the other teats of the animal.

In another embodiment, if the animal is given the partial milking permission, teat cups are attached to, and milking is started of, the teats of all the udder compartments of the animal. During a short period of time it is established in which of the teat cups a milk flow above a selected threshold is obtained. Immediately after the expiry of the short period of time, the teat cups, in which a milk flow above the selected threshold is not obtained, are detached from the teats, while keeping the other teat cups attached during the following milking. This embodiment is typically implemented when it is not generally known which udder compartment was incompletely milked from the last time the animal was milked.

According to a second aspect of the invention there is provided a milking system in which the method of the first aspect can be implemented. Such milking system comprises, except for the milking machine, a teat cup attachment device, a control device, and optionally entry and exit gates and an identification device at the entry to the milking system. Preferably, the control device receives identification information from the optional identification device and controls the milking machine, the teat cup attachment device, and the optional entry and exit gates.

By means of the present invention the overall milk production is optimized since the milking of an animal that follows an incomplete milking of that animal is made faster. The utilization of the milking system is increased. Concurrently, the animal care and treatment are improved since the wear of the teats is reduced.

Further characteristics of the invention and advantages thereof, will be evident from the detailed description of preferred embodiments of the present invention given hereinafter and the accompanying FIGS. 1-2, which are given by way of illustration only, and thus are not limitative of the present invention.

DETAILED DESCRIPTION OF EMBODIMENTS

Figure 1:
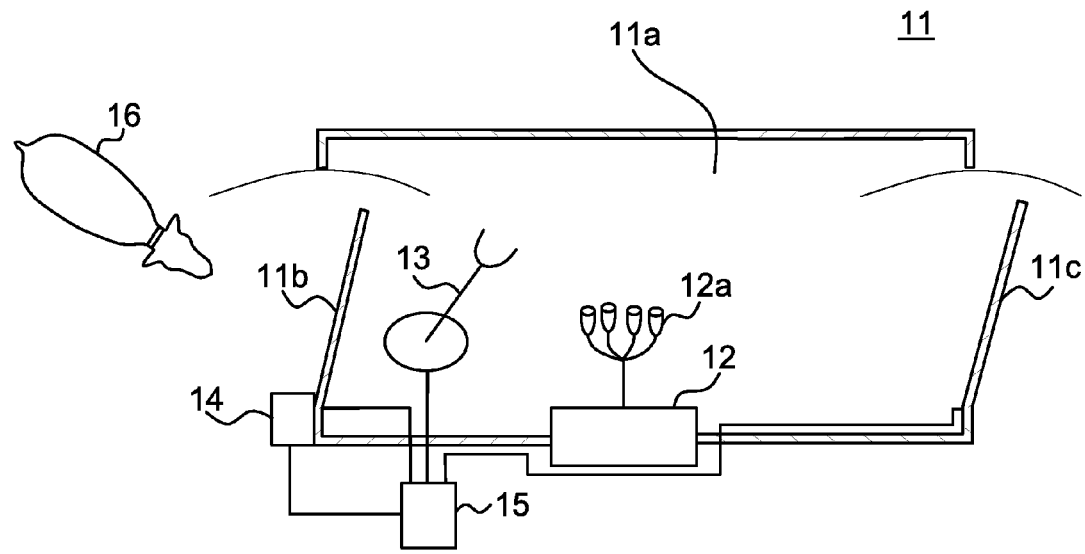
FIG. 1 illustrates schematically a milking system in accordance with an embodiment of the invention.

FIG. 1 illustrates a milking system 11 for automated milking of an animal 16, wherein the milking system 11 includes an enclosed area 11a, entry 11b and exit 11c gates, a milking machine 12 provided with a plurality of teat cups 12a, a teat cup attachment device 13, an animal identification device 14, and a control computer 15 which is operatively connected to the entry 11b and exit 11c gates, the milking machine 12, the teat cup attachment device 13, and the animal identification device 14. The milking system 11 may further comprise sensors and measuring devices (not explicitly illustrated) for measuring various parameters including milk yields and milk quality in connection with the milking. In particular, the milk yields may, in some instances, be recorded on an udder compartment individual basis.

The entry 11b and exit 11c gates are preferably automatically openable and closable. The milking machine 12 is preferably an automatic milking machine which is provided for automatically milking animals present in the enclosed milking system 11. The teat cup attachment device 13 is preferably a robot arm provided for automatically attaching teat cups 12a to the animals present in the enclosed milking system 11. The animal identification device 14 is provided to automatically identify an animal 16 that presents itself in front of the entry gate 11b.

The control computer 15 is typically responsible for the overall control of the milking system 11 and its operation. In particular, the control computer 15 is connected to receive and store identification information from the animal identification device 14 and to control the operation of the entry 11b and exit 11c gates, the milking machine 12, and the teat cup attachment device 13. Further, the control computer 15 may be connected to receive and store information from the sensors and measuring devices of the milking system 11.

Still further, the control computer 15 holds and updates information regarding each animal visiting the milking system 11. In particular, the control computer 15 holds and updates milking permission information for each animal. Further, the control computer 15 measures and stores milking times for each milking of each animal, and optionally for each milking of each udder compartment of each animal. Yet further, the control computer 15 measures and stores times lapsed between each milking of each animal, and optionally between each milking of each udder compartment of each animal.

A normal or regular milking procedure is as follows. An animal 16 that presents itself in front of the entry gate 11b is identified by the animal identification device 14 and the identification information is passed over to the control computer 15, which checks whether the animal has a regular milking permission, and if this is the case, the control computer 15 controls the entry gate 11b to open and allow the animal to enter the milking system 11. Criteria for determining regular milking permission have been discussed extensively in the art and will thus not be addressed further here.

The control computer 15 controls the teat cup attachment device 13 to attach the teat cups 12a to the teats of the animal that has entered the milking system 11 and controls the milking machine 12 to milk the animal. When milking has terminated the control computer 15 controls the exit gate 11c to open and allow the animal to leave the milking system 11.

Sometimes the milking is not complete, that is, milking is terminated and the animal is allowed to leave the milking system despite that an udder compartment is not completely emptied. This may happen after a teat cup kick or fall off. Conditions for when re-attachment of a teat cup to, and re-starting the milking of, a teat, in case of a teat cup kick or fall off, are disclosed in WO2004/100650, the contents of which being hereby incorporated by reference. If such conditions are not met the udder compartment is left incompletely milked as the animal is allowed leave the milking system after milking.

According to prior art, such milking animal has obtained a new regular milking permission directly or soon after the milking, which means that the animal has been allowed to enter the milking system 11 again as soon as the animal has been identified again at the front of the entry gate 11b.

According to an embodiment of the present invention the control computer 15 is instead provided to determine whether an animal, which presents itself at the entry gate 11b of the milking system 11, is identified by the animal identification device 14, and does not obtain a regular milking permission, has at least one udder compartment that was incompletely milked from the last time the animal was milked.

For instance, the control computer 15 can determine that an animal that is identified by the animal identification device 14 has at least one udder compartment that was incompletely milked from the last time the animal was milked if the milk yield from that animal or from that udder compartment (if this was measured individually) was below a first threshold value last time the animal was milked and/or if the milking time for that udder compartment was below a second threshold value last time the animal was milked.

The first and second threshold values can be values independent of the animal or can be values dependent on the animal, preferably percentage values of an expected milk yield and milking time for the animal.

Next, the control computer 15 is provided to give the animal a partial milking permission depending on the above determination, that is, if the animal is determined to have at least one udder compartment that was incompletely milked from the last time the animal was milked. A partial milking permission is a permission for a partial milking as described below.

It shall be noted here that the partial milking permission for the animal may be given depending on a utilization, or an expected upcoming utilization, of the milking system 11. That is, if the utilization, or expected upcoming utilization, of the milking system 11 is high, the partial milking permission will not be given. Alternatively, if the utilization, or expected upcoming utilization, of the milking system 11 is high, the partial milking permission will be harder to get.

This would be obtained if the above threshold values were to be made dependent on the utilization of the milking system 11. For instance, if the utilization of the milking system is high, the first and second thresholds could be lowered.

The thresholds and the utilization may be entered into the control computer 15 manually or may be calculated. Further, they may be static or they may be dynamically changed at any given pace.

Finally, if the animal is given the above partial milking permission, a partial milking procedure takes place. The control computer 15 is provided to control the teat cup attachment device 13 to attach a teat cup 12a to, and to control the milking machine 12 to start milking of, only the teat or teats of the udder compartment or compartments that was/were determined to be incompletely milked from the last time the animal was milked. After milking of this udder compartment or these udder compartments is completed the control computer 15 controls the detachment of the teat cup or cups 12a attached the teat or teats of the animal, and the exit gate 11c to open to allow the milking animal to leave the milking system 11 without any teat cups 12a being attached to the other teats of the animal.

Hereby, the milking procedure including the automatic teat cup attachment is performed faster and the wear on the teats of the animal is reduced.

In an alternative embodiment the partial milking permission involves a partial milking procedure with the following actions.

The control computer 15 is provided to control the teat cup attachment device 13 to attach teat cups 12a to, and to control the milking machine 12 to start milking of, the teats of all the udder compartments of the animal. During a short period of time, e.g. less than about 30 seconds, preferably less than about 15 or 20 seconds, it is established in which of the teat cups 12a a milk flow above a selected threshold is obtained. After the expiry of the short period of time, the teat cups, in which a milk flow above the selected threshold is not obtained, are immediately detached from the teats, while the other teat cups are kept attached during the following milking.

Also in this embodiment, the milking procedure including the automatic teat cup attachment is performed faster and the wear on the teats of the animal is reduced since teat cups will not be detached after such a short time in the regular milking procedure. This embodiment is particularly suitable when it is not generally known which of the udder compartments that was/were incompletely milked from the last time the animal was milked since this is established in the partial milking procedure.

Generally, the regular and partial milking procedures differ from one another with respect to the procedure for the attachment of the teat cups to, and/or detachment of the teat cups from, the teats of the animal, preferably such that the partial milking procedure will be faster than the regular milking procedure and/or such that the wear on the teats of the animal is less in the partial milking procedure than in the regular milking procedure.

It shall be appreciated that while the present invention introduces the concept of partial milking permission, the regular milking permission, that is, the normal or regular milking permission for an animal, is not affected.

Figure 2:
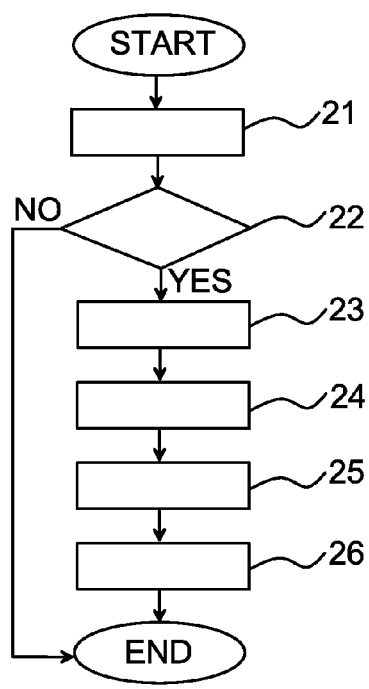
FIG. 2 is a flow scheme of a method for milking in accordance with an embodiment of the invention.

With reference next to FIG. 2, a method for milking in accordance with an embodiment of the invention is shortly described. In a step 21, an animal is identified as not having a regular milking permission at a milking system. Next, in a step 22, it is checked whether the animal has at least one udder compartment that was incompletely milked from the last time the animal was milked. This checking may be made as described above with reference to FIG. 1. If the animal fulfills the criterion, the animal is, in a step 23, given a partial milking permission, and if the animal does not fulfill the criterion the method is ended.

If the animal is given the partial milking permission, a teat cup is, in a step 24, attached to, and milking is, in a step 25, started of, only the teat of the at least one udder compartment that was determined to be incompletely milked from the last time the animal was milked. When the milking of the at least one udder compartment is completed, the animal is, in a step 26, allowed to leave the milking system without that teat cups are attached to the other teats of the animal.

It shall further be noted that according to a further embodiment of the present invention there is provided a computer program product loadable into the internal memory of a computer of a milking system, comprising software code portions for controlling the method as described above when the product is run on the computer.

The invention claimed is:

1. A method for milking in an automated milking system (11) comprising a milking machine (12) with a plurality of teat cups (12a), which teat cups are attached to, and detached from, teats of an animal as part of milkings of the animal, comprising the steps of:
using a control computer to hold and update milking permission information for the animal;
subsequent to a last milking session and prior to a next milking session of the animal, i) having the control computer make a determination of whether the animal has at least one udder compartment that was incompletely milked in the last milking of the animal, ii) when the determination is that the animal has at least one udder compartment that was incompletely milked in the last milking of the animal, having the control computer give the animal a partial milking permission;
when the animal is presented at the milking system for milking, using the control computer to determine whether the animal has a regular milking permission, i) upon determining that the animal has the regular milking permission, milking the animal in a regular milking procedure, the regular milking procedure being performed under control of the control computer, and ii) upon determining that the animal does not have the regular milking permission and that the animal has been given a partial milking permission, milking the animal in a partial milking procedure, the partial milking procedure being performed under control of the control computer, wherein,
the regular and partial milking procedures differ from one another with respect to a procedure for the attachment and detachment of the teat cups to and from the teats of the animal such that only teats established to correspond to incompletely milked udder compartments are milked during the partial milking procedure, and
when said step of determining that the animal has at least one udder compartment that was incompletely milked in the last milking of the animal does not identify which udder compartment was incompletely milked, the milking of the animal in the partial milking procedure comprises the control computer i) attaching the teat cups to the teats of all the udder compartments of the animal and beginning a milking of all the teats, ii) after a predetermined time from the beginning of the milking, for each teat cup determining whether the milk flow in that teat cup is above a threshold value, wherein teat cups obtaining the milk flow above the threshold value are established to correspond to incompletely milked udder compartments and teat cups not obtaining the milk flow above the threshold value are not established to correspond to incompletely milked udder compartments, and iii) detaching the teat cups from the teats not established to correspond to the incompletely milked udder compartments where the milk flow was not determined to be above the threshold value, and, for the teat cups of the teats corresponding to the incompletely milked udder compartments where the milk flow was determined to have been above the threshold value, performing the partial milking procedure by retaining the teat cups on the teats and continuing to milk the incompletely milked udder compartments.

2. The method of claim 1, wherein,
said giving the partial milking permission to the animal that has at least one udder compartment that was incompletely milked in the last milking of the animal, is based on at least one of i) a milk yield from that animal or that udder compartment was below a first threshold value the last time the animal was milked, and ii) a milking time for that udder compartment was below a second threshold value last time the animal was milked, and
said respective one of said first and second threshold values is a function of the upcoming expected utilization of the milking system.

3. The method of claim 2, wherein,
the first threshold value is a value dependent on the specific animal being presented for milking, and a percentage value of an expected milk yield for the udder compartment of the specific animal.

4. The method of claim 2, wherein the second threshold value is a value dependent on the specific animal being presented for milking and a percentage value of an expected milking time for the udder compartment of the specific animal.

5. The method of claim 1, wherein said giving the partial milking permission to the animal that has at least one udder compartment that was incompletely milked in the last milking of the animal, is further based on a utilization of the milking system.

6. The method of claim 1, wherein,
when said step of determining that the animal has at least one udder compartment that was incompletely milked in the last milking of the animal does identify which udder compartment was incompletely milked, a teat cup is attached (24) to, and milking is started (25) of, only the teat for the udder compartment that was determined to be incompletely milked from the last time the animal was milked; and
the animal is allowed (26) to leave said milking system when the milking of the udder compartment that determined to be incompletely milked from the last time the animal was milked is completed, and
in the partial milking procedure, teat cups are not attached to the other teats of the animal.

7. The method of claim 1, wherein said step of for each teat cup determining whether the milk flow in that teat cup is above a threshold value, the predetermined time is less than 30 seconds from a start of the milking.

8. The method of claim 1, wherein said step of for each teat cup determining whether the milk flow in that teat cup is above a threshold value, the predetermined time is less than 20 seconds.

9. A non-transitory computer readable medium computer program storing a computer program product loadable into the internal memory of the control computer of a milking system, comprising software code portions for controlling the control computer to control milking in an automated milking system (11) comprising a milking machine (12) with a plurality of teat cups (12a), which teat cups are attached to, and detached from, teats of an animal as part of milkings of the animal, the milking comprising the steps of:
the control computer holding and updating milking permission information for the animal;
subsequent to a last milking session and prior to a next milking session of the animal, i) the control computer making a determination of whether the animal has at least one udder compartment that was incompletely milked in the last milking of the animal, ii) when the determination is that the animal has at least one udder compartment that was incompletely milked in the last milking of the animal, the control computer giving the animal a partial milking permission;
when the animal is presented at the milking system for milking, the control computer determining whether the animal has a regular milking permission, i) upon determining that the animal has the regular milking permission, milking the animal in a regular milking procedure, the regular milking procedure being performed under control of the control computer, and ii) upon determining that the animal does not have the regular milking permission and that the animal has been given a partial milking permission, milking the animal in a partial milking procedure, the partial milking procedure being performed under control of the control computer, wherein,
the regular and partial milking procedures differ from one another with respect to a procedure for the attachment or detachment of the teat cups to and from the teats of the animal such that only teats established to correspond to incompletely milked udder compartments are milked during the partial milking procedure, and
when said step of determining that the animal has at least one udder compartment that was incompletely milked in the last milking of the animal, identifies which udder compartment was incompletely milked, the milking of the animal in the partial milking procedure comprises the control computer attaching a teat cup to, and starting milking of, only the teat for the udder compartment that was identified to be incompletely milked from the last time the animal was milked.

10. A method for milking in an automated milking system (11) comprising a milking machine (12) with a plurality of teat cups (12a), which teat cups are attached to, and detached from, teats of an animal as part of milkings of the animals, comprising the steps of:
using a control computer to hold and update milking permission information for the animal;
using the control computer, determining whether an animal, being presented at the milking system for milking, has a regular milking permission, and upon determining that the presented animal has a regular milking permission, milking the animal in a regular milking procedure, the regular milking procedure being performed under control of the control computer;
determining that the animal has at least one udder compartment that was incompletely milked in the last milking of the animal, and when the determination is that the animal has at least one udder compartment that was incompletely milked in the last milking of the animal, giving the animal a partial milking permission; and
using the control computer, i) determining whether the animal being presented at the milking system for milking has been given the partial milking permission, and ii) upon determining that the animal has been given a partial milking permission, milking the animal in a partial milking procedure, the partial milking procedure being performed under control of the control computer, wherein the regular and partial milking procedures differ from one another with respect to a procedure for the attachment or detachment of the teat cups to and from the teats of the animal such that only teats established to correspond to incompletely milked udder compartments are milked during the partial milking procedure.

11. The method of claim 10, wherein when said step of determining that the animal has at least one udder compartment that was incompletely milked in the last milking of the animal does not identify which udder compartment was incompletely milked, the milking the animal in the partial milking procedure comprises the control computer i) attaching the teat cups to the teats of all the udder compartments of the animal and beginning a milking of all the teats, ii) establishing which teats correspond to incompletely milked udder compartments by, after a predetermined time from the beginning of the milking, for each teat cup, determining whether the milk flow in that teat cup is above a threshold value and thereby indicating correspondence to the incompletely milked udder compartments, and iii) detaching the teat cups from the teats where the milk flow was not determined to be above the threshold value and thereby not indicating correspondence to incompletely milked udder compartments, and, for the teat cups determined to have the milk flow above the threshold value corresponding to the incompletely milked udder compartments, performing the partial milking procedure by retaining the teat cups on the teats and continuing milking.

12. The method of claim 10, wherein,
said giving the partial milking permission to the animal that has at least one udder compartment that was incompletely milked in the last milking of the animal, is based on at least one of i) a milk yield from that animal or that udder compartment was below a first threshold value the last time the animal was milked and ii) a milking time for that udder compartment was below a second threshold value last time the animal was milked, and
said respective one of said first and second threshold values is a function of the upcoming expected utilization of the milking system.

13. The method of claim 10, wherein the first threshold value is a value dependent on the specific animal being presented for milking, and a percentage value of an expected milk yield for the udder compartment of the specific animal.

14. The method of claim 10, said giving the partial milking permission to the animal that has at least one udder compartment that was incompletely milked in the last milking of the animal, is a function of an expected upcoming utilization of the milking machine.

15. The method of claim 10, wherein,
when said step of determining that the animal has at least one udder compartment that was incompletely milked in the last milking of the animal does identify which udder compartment was incompletely milked, a teat cup is attached (24) to, and milking is started (25) of, only the teat for the udder compartment that was determined to be incompletely milked from the last time the animal was milked; and
the animal is allowed (26) to leave said milking system when the milking of the udder compartment that determined to be incompletely milked from the last time the animal was milked is completed, and
in the partial milking procedure, teat cups are not attached to the other teats of the animal.

16. A method for milking in an automated milking system (11) comprising a milking machine (12) with a plurality of teat cups (12a), which teat cups are attached to, and detached from, teats of an animal as part of milkings of the animals, comprising the steps of:
using a control computer to hold and update milking permission information for the animal;
subsequent to a last milking session and prior to a next milking session of an animal, i) having the control computer make a determination of whether the animal has at least one udder compartment that was incompletely milked in the last milking of the animal, ii) when the determination is that the animal has at least one udder compartment that was incompletely milked in the last milking of the animal, having the control computer give the animal a partial milking permission; and
when the animal has been given a partial milking permission, milking the animal using a partial milking procedure, the partial milking procedure being performed under control of the control computer,
wherein a regular milking procedure and the partial milking procedure differ from one another with respect to a procedure for the attachment and detachment of the teat cups to and from the teats of the animal such that only teats established to correspond to incompletely milked udder compartments are milked during the partial milking procedure.

17. The method of claim 16, wherein said step of having a control computer make a determination of whether the animal has at least one udder compartment that was incompletely milked in the last milking of the animal, identifies which udder compartment was incompletely milked, a teat cup is attached (24) to, and milking is started (25) of, only the teat for the udder compartment that was determined to be incompletely milked from the last time the animal was milked, the partial milking procedure being faster than the regular milking procedure.

18. The method of claim 17, wherein when said step of determining that the animal has at least one udder compartment that was incompletely milked in the last milking of the animal does not identify which udder compartment was incompletely milked, the milking of the animal in the partial milking procedure comprises the control computer i) attaching the teat cups to the teats of all the udder compartments of the animal and beginning a milking of all the teats, ii) establishing which teats correspond to incompletely milked udder compartments by, after a predetermined time, for each teat cup determining whether the milk flow in that teat cup is above a threshold value indicating correspondence to incompletely milked udder compartments, and iii) detaching the teat cups from the teats where the milk flow was not determined to be above the threshold value and thereby not indicating correspondence to incompletely milked udder compartments, and, for the teat cups determined to have the milk flow above the threshold value corresponding to the incompletely milked udder compartments, performing the partial milking procedure by retaining the teat cups on the teats and continuing to milk the incompletely milked udder compartments.

19. The method of claim 16, comprising the further steps of:
using the control computer, determining whether an animal, being presented at the milking system for milking has been given a regular milking permission; and
upon determining that the presented animal has the regular milking permission, milking the animal in the regular milking procedure, the regular milking procedure being performed under control of the control computer.

20. The method of claim 16, wherein,
said step of having the control computer give the animal the partial milking permission to the animal has at least one udder compartment that was incompletely milked in the last milking of the animal, is a function of an upcoming expected utilization of the milking system.

21. The method of claim 16, wherein,
said giving the partial milking permission to the animal that has at least one udder compartment that was incompletely milked in the last milking of the animal, is based on at least one of i) a milk yield from that animal or that udder compartment was below a first threshold value the last time the animal was milked and ii) a milking time for that udder compartment was below a second threshold value last time the animal was milked, and
said respective one of said first and second threshold values is a function of the upcoming expected utilization of the milking system.

22. The method of claim 21, wherein the second threshold value is a value dependent on the specific animal being presented for milking and a percentage value of an expected milking time for the udder compartment of the specific animal.

23. The method of claim 16, wherein the partial milking procedure comprises the control computer i) attaching the teat cups to the teats of all the udder compartments of the animal and beginning a milking of all the teats, ii) establishing which teats correspond to incompletely milked udder compartments by, after a predetermined time from the beginning of the milking, for each teat cup determining whether the milk flow in that teat cup is above a threshold value indicating correspondence to incompletely milked udder compartments, and iii) detaching the teat cups from the teats where the milk flow was not determined to be above the threshold value and thereby not indicating correspondence to incompletely milked udder compartments, and, for the teat cups determined to have the milk flow above the threshold value corresponding to the incompletely milked udder compartments, performing the partial milking procedure by retaining the teat cups on the teats and continuing to milk the incompletely milked udder compartments.

24. The method of claim 16, wherein,
when said step of determining that the animal has at least one udder compartment that was incompletely milked in the last milking of the animal does identify which udder compartment was incompletely milked, a teat cup is attached (24) to, and milking is started (25) of, only the teat for the udder compartment that was determined to be incompletely milked from the last time the animal was milked; and
the animal is allowed (26) to leave said milking system when the milking of the udder compartment that determined to be incompletely milked from the last time the animal was milked is completed, and
in the partial milking procedure, teat cups are not attached to the other teats of the animal.

25. A milking system (11) for automated milking by performing the method as claimed in claim 16 and comprising the milking machine (12) with the plurality of teat cups (12a), a teat cup attachment device (13), and a control computer for controlling the teat cup attachment device to attach teat cups to teats of the animal as part of the milkings of the animals.

* * * * *